United States Patent [19]

McLane

[11] 3,947,906

[45] Apr. 6, 1976

[54] SWIMMING EQUIPMENT

[76] Inventor: Merle McLane, 5602 Lee Highway, Apt. 302, Arlington, Va. 22207

[22] Filed: Apr. 24, 1975

[21] Appl. No.: 571,052

[52] U.S. Cl. .................................... 9/301; 114/16 E

[51] Int. Cl.² ........................................ A63B 31/08

[58] Field of Search ....... 9/301, 311, 314, 322, 328, 9/329, 338, 339; 114/16 A, 16 E, 16 F; 115/21, 22.1, 22.2, 22.3; 61/69 R, 69 A; 272/1 B, 71

[56] References Cited

UNITED STATES PATENTS

| | | | |
|---|---|---|---|
| 1,094,538 | 4/1914 | Davis | 9/338 |
| 3,204,596 | 9/1965 | Fallon | 114/16 E |
| 3,428,980 | 2/1969 | Newton | 9/301 |

FOREIGN PATENTS OR APPLICATIONS

| | | | |
|---|---|---|---|
| 649,219 | 11/1962 | Italy | 114/16 A |

*Primary Examiner*—Trygve M. Blix
*Assistant Examiner*—Stuart M. Goldstein
*Attorney, Agent, or Firm*—Crickenberger & Moore

[57] ABSTRACT

Underwater swimming equipment comprises a container holding a bladder member compressible by a wheel and screw-driven plate member. A fin assembly is connected to the container by a belt and shoulder strap members constituting a swimmer's harness.

4 Claims, 4 Drawing Figures

SWIMMING EQUIPMENT

CROSS REFERENCES TO RELATED APPLICATIONS

None

BACKGROUND OF THE INVENTION

Swimming has always been a popular water sport as well as a valuable survival skill. Unfortunately, there is always a large number of people who do not know how to swim, and, consequently are deprived of the fun and enjoyment, as well as the healthful exercise, obtained by swimming.

There are various articles of equipment available today to serve as aids for swimmers. One of the most commonly used aids is the detachable fin designed to fit the foot, the leg, the arm or the hand of the swimmer. The fin, when used alone, serves to increase the propulsive thrust of the swimmer through the water, and is not designed to impart any buoyancy. There has been some limited use of body fins in conjunction with certain forms of kicking motions, but in such cases the fins are dependent upon the propulsive actions of the swimmer.

Anyone who has participated in water sports of any kind is familiar with inflatable devices such as "water wings" or conventional tire innertubes which are used universally to achieve buoyancy and support for the non-swimmer who is unable to remain afloat. If forward motion through the water is desired, the swimmer must possess sufficient skill and dexterity to paddle or kick with the correct motions.

SUMMARY OF INVENTION

It is an object of the present invention to provide swimming equipment which will allow an untrained swimmer to remain afloat and achieve forward progress in the water without the knowledge or ability to perform any of the conventional swimming movements. The object is realized in a swimmer's harness which straps to the body of a swimmer a container holding a compressible bladder member to furnish buoyancy and fin members to furnish forward propulsive force.

A wheel and screw-driven plate member forming a portion of the bladder container is operated by the swimmer to alternately compress and release the bladder, thereby causing the swimmer's body to sink and then be buoyed upward. The fin members attached to the swimmer's body have upper and lower surfaces shaped to produce a forward thrust as the fins are moved vertically in the water with the downward and upward motion of the swimmer's body.

DESCRIPTION OF THE PREFERRED EMBODIMENT

Figure 1:
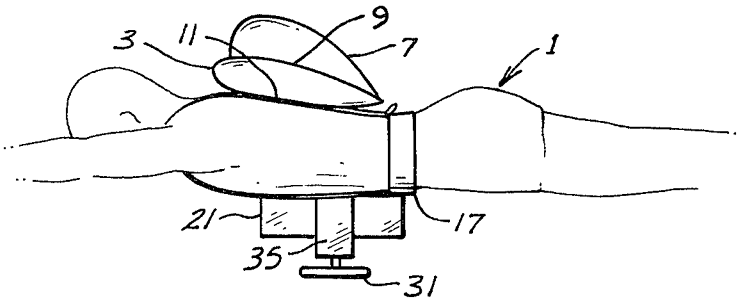
FIG. 1 is a side elevation view of a swimmer with the equipment of the invention attached.
Figure 2:
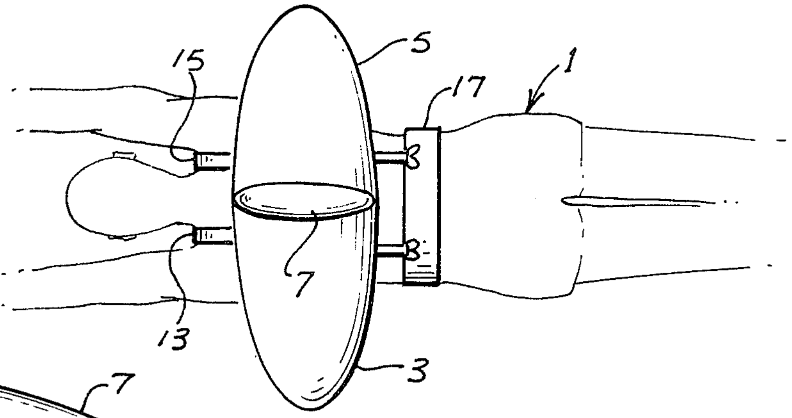
FIG. 2 is a top view of the swimmer and equipment shown in FIG. 1.

The invention will be understood more readily by referring to the drawings in which FIG. 1 shows the body of a swimmer generally indicated at 1 and shown in an extended position such as would be assumed in the water. FIG. 2 is a top view of the swimmer shown in FIG. 1, and both views illustrate the equipment of the invention in position on the body of the swimmer 1.

Figure 3:
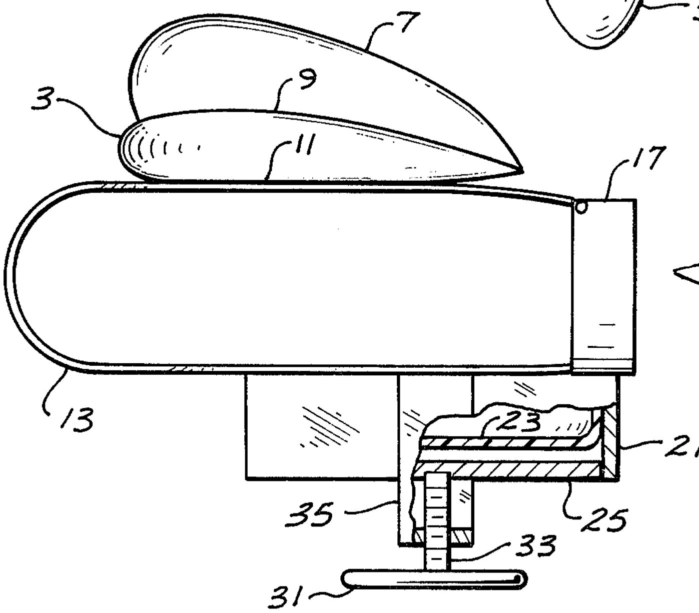
FIG. 3 is a side elevation in partial cross-section of the equipment of the invention.
Figure 4:
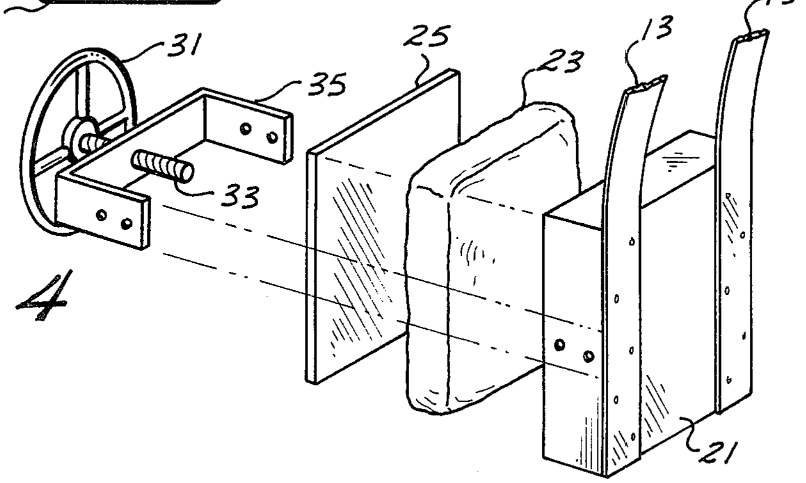
FIG. 4 is an exploded perspective view of the bladder member and container.

The equipment is shown in more detail in FIG. 3 which is a partial cross section, and in FIG. 4 which is an exploded perspective view of the container. The equipment comprises three fin members, 3, 5, and 7. Fin members 3 and 5 are disposed horizontally and are connected to each other to form a unitary structure. Fin member 7 is disposed perpendicularly to the plane of fin members 3 and 5 and located midway there between. It will be noted from the cross sectional view of fin member 3 as seen in FIGS. 1 and 3 that the upper surface 9 and lower surface 11 taper downwardly and upwardly, respectively from the front to the back of the fin. The assembly is connected to a pair of shoulder straps 13 and 15, the ends of which are attached to belt member 17 to form a harness structure to be worn by the swimmer.

Attached to shoulder straps 13 and 15 on the under side of the harness is a container 21. Container 21 has mounted therein a bladder member 23 formed of an impermeable resilient material to contain air to be compressed. One wall of container 21 comprises a movable plate member 25 which is forced against bladder member 23 to compress it into a smaller volume. The force to effect the compression is obtained by means of wheel 31 and screw member 33. Screw member 33 is threadedly mounted in a U-shaped brace 35 fixed to the sides of container member 21.

In operation the swimming equipment is strapped to the body of the swimmer with the fin assembly across the shoulders of the swimmer and the compressible bladder member assembly mounted near the swimmer's waist at the front of the swimmer's body. The wheel 31 is adjusted manually by the swimmer until bladder member 23 is compressed to the correct volume so that the swimmer's body floats partially submerged at the surface of the water. Bladder member 23 is then compressed by turning wheel 31 and forcing plate 25 against bladder member 23 until the reduction in volume of bladder member 23 causes the body of the swimmer to move downwardly in the water.

The downward movement of the swimmer causes water to move across the tapered undersurface 11 of fin member 3 and the corresponding surface of fin member 5 to produce a forward propulsive force and move the body forward. The body of the swimmer is then raised to the surface of the water by releasing the pressure of plate number 25 against bladder member 23 allowing bladder member 23 to expand in size and produce a buoyant force moving the swimmer's body upwardly in the water. During the upward motion, water is forced along the tapered upper surface 9 of fin member 3 and the corresponding surface of fin member 5 to produce again a propulsive force moving the body of the swimmer forward in the water.

The swimmer is thus able to achieve forward progress in the water, the rate of which is determined by the rapidity of the compression and expansion motions of the bladder member. Fin member 7 acts as a stabilizer or rudder to minimize sideward motion.

In a practical embodiment the bladder member is made inflatable and adjustable in size so that the swimmer may achieve the desired initial balance of buoyant forces. Although only one embodiment has been shown, many modifications of the bladder unit are possible. As an example, the fin member could be constructed as an air tank with a pump being utilized instead of the wheel and screw apparatus shown to transfer air from the tank to the bladder and vice versa.

What is claimed is:

1. Swimming equipment for attachment to the body of a swimmer comprising a harness, said harness comprising shoulder strap members and a belt member to fasten on the body of a swimmer, a fin member attached to said harness, a press apparatus attached to said harness, a bladder member within said press apparatus, said press apparatus including means operable manually by the swimmer to compress said bladder member into a smaller volume and to release said bladder from its compressed state to expand to its original volume, whereby the swimmer may alternately compress and release said bladder member to cause alternate sinking and rising toward the surface of the water thereby causing water to flow over the surfaces of said fin member and produce forward motion for the body of the swimmer.

2. The combination according to claim 1 wherein said fin member is disposed horizontally, and has an upstanding fin member connected thereto to serve as a stabilizer to enable the swimmer to maintain a straight course in the water.

3. The combination according to claim 2 wherein said press apparatus comprises a box-like container, one wall of which is a movable plate to be moved back and forth against said bladder to compress and release.

4. The combination according to claim 3 wherein said movable plate is moved by a wheel and screw mechanism operated by the swimmer.

* * * * *